United States Patent [19]

Kofink

[11] 4,354,150

[45] Oct. 12, 1982

[54] ELECTRICAL GENERATOR

[75] Inventor: Wolfgang Kofink, Aichwald, Fed. Rep. of Germany

[73] Assignee: Robert Bosch GmbH, Stuttgart, Fed. Rep. of Germany

[21] Appl. No.: 140,718

[22] Filed: Apr. 16, 1980

[30] Foreign Application Priority Data

May 23, 1979 [DE] Fed. Rep. of Germany ....... 2920863

[51] Int. Cl.³ .............................................. H02P 9/10
[52] U.S. Cl. ...................................... 322/63; 322/89; 322/95
[58] Field of Search .................................... 322/63–67, 322/89, 90, 94, 95

[56] References Cited

U.S. PATENT DOCUMENTS

| 3,205,429 | 9/1965 | Robinson | 322/63 X |
| 3,866,110 | 2/1975 | Ruggeri | 322/95 X |
| 4,117,388 | 9/1978 | Roche | 322/63 X |
| 4,233,555 | 11/1980 | Roche | 322/63 X |

Primary Examiner—Robert J. Hickey
Attorney, Agent, or Firm—Frishauf, Holtz, Goodman & Woodward

[57] ABSTRACT

A slip ring less, three-phase, AC generator especially for motor vehicles, in which the compound winding is subdivided into individual components which are directly interconnected within the branches of the rectifier bridge supplying direct current for the on-board electrical system so that the voltage drop across the compound winding is sensed and compensated by the regulator. The compound winding can be wound of wire having a small diameter.

6 Claims, 1 Drawing Figure

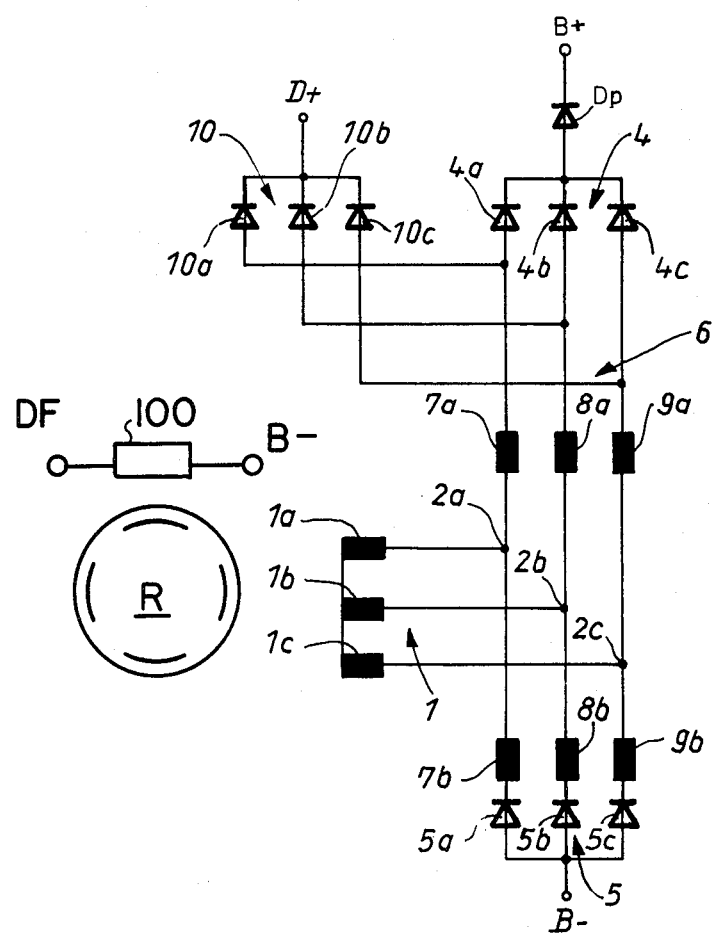

ELECTRICAL GENERATOR

The invention relates to electrical generators and more particularly, to AC generators without slip rings intended for use in mobile power supplies, motor vehicles, railway cars and the like.

BACKGROUND AND PRIOR ART

On-board electrical systems of mobile units often use AC generators having a three-phase armature winding on the stator connected in Y or Δ configuration. Rotation of a field relative to the armature by a suitable power source induces a three-phase current in the armature, usually in the form of stator windings. The rotor commonly carries an exciter winding which receives exciter current via two slip-rings. In less frequent cases, the exciter winding also is stationary and the changing magnetic field for inducing alternating current in the armature stator windings is produced by means of specially shaped rotating components, e.g. a claw pole structure.

Because on-board electrical systems of motor vehicles are usually direct-current systems, the three-phase alternating currents are rectified by a rectifier bridge commonly including three so-called negative diodes and three positive diodes. Three complementary exciter diodes may also be present to produce an exciter current which is regulated by a regulator in response to a given load and rpm of the three-phase generator. The regulated current is supplied to the exciter winding.

Some generators have a compound winding which is normally so connected that the entire load current flows through it. This compound winding carries a supplementary exciter current and provides a load current dependent excitation.

A load current dependent voltage drop occurs across the compound winding, a result of being connected directly to the positive on-board B+ terminal. To keep the voltage drop low, it is therefore necessary to wind the compound winding with large diameter wire which entails substantial expense. In addition, the unavoidable voltage drop of the compound winding is not compensated by the regulator, because the exciter diodes feeding the regulator, and connected to the D+ terminal of generator system, are connected directly to the armature phase windings of the stator, resulting in undesirable regulation characteristics of the generator.

THE INVENTION

It is a principal object of the present invention to provide a three phase AC generator without slip rings and with at least one compound winding which is wound of wire having a relatively small diameter while keeping the voltage drop across the compound winding small.

Briefly, the compound winding of the generator is divided into sections, one or more of which are placed in the branches of the rectifier circuit.

The circuit of the invention has the advantage that the reduced output voltage, due to the voltage drop across the compound winding is sensed by the regulator and can be compensated without difficulty, permitting the generator to maintain full voltage regulation and load response even with compounding.

A still further advantage is that the compound winding and a protective diode connected between B+ and B− provide protection against a reversal of polarity.

DRAWING

The single FIGURE is a schematic wiring diagram of an AC generator showing the disposition of the individual components and of a compound winding.

DESCRIPTION OF THE PREFERRED EMBODIMENT

The basic principle underlying the present invention is the subdivision of the compound winding required for "compounding" a generator, preferably slip ring less generator, into several components and to place these components in the branches of the rectifier bridge. As a result, each of the winding components carries only a part of the load current. A conventionally wired regulator senses the voltage drop across the compound windings, if the exciter current is produced by separate exciter windings. Moreover, the compound windings can be wound of wire having a smaller cross section due to their carrying a smaller load current.

The armature winding 1 has component phase windings 1a, 1b, 1c which produce the three separate voltages of the three-phase AC generator. The three voltages are mutually offset by 120 degrees. Normally, the junctions 2a, 2b, 2c of the phase windings 1a, 1b, 1c would be connected to the inner junction rectifier bridge 6 which consists of the three "plus"-diodes 4 and of the three "minus"-diodes 5. According to the invention and as shown in the FIGURE, the armature winding terminals 2a, 2b, 2c are connected to the compound winding, which is split into winding components. Thus, terminals 2a, 2b, 2c are connected, respectively, to the junctions of pairs of compound winding components 7a-7b, 8a-8b, and 9a-9b. The paired compound winding components are connected in series with each other as well as with the associated plus-diodes and minus-diodes.

For example, a typical phase is associated with a series-connection of one plus-diode 4a, a first compound winding component 7a (which can also be designated as a positive compound winding component), a further compound winding component 7b (which can also be designated as a negative compound winding component) and a minus-diode 5a. The total of three such series-connected branches forms an extended rectifier bridge compound winding circuit. The cathodes of the plus-diodes 4a, 4b, 4c and the anodes of the minus-diodes 5a, 5b, 5c are then interconnected in conventional manner to form, respectively, the B+ and B− connections of the on-board electrical system. A protective diode D can be interposed between the rectifier 6 output and terminal B+ to protect against reverse connection of the battery.

In the embodiment shown, the anodes of the exciter diodes 10a, 10b, 10c are connected directly to the anodes of the main plus-diodes 4a, 4b, 4c. The regulator input connection D+ is formed at the interconnected cathodes of the exciter diodes 10a, 10b, 10c. Its output terminal, usually labeled DF, is connected to the field or exciter winding 100, the other terminal of which is connected to B−, as well known and standard in automotive on-board power supply systems.

A corresponding circuit arrangement having the six compound winding components 7a-9a and 7b-9b of the present exemplary embodiment is also possible with a Delta-connection of the armature windings. In that case, each of the individual compound winding components carries only one sixth of the entire load current produced by the three-phase AC generator feeding the on-board electrical system. The "compounding" of a generator is particularly applicable to a slip ring less generator, in which the exciter winding does not rotate but is stationary, as discussed above. The individual compound windings component receives current directly without a slip ring connection. The six compound winding components shown are not always required to implement the invention, because even placement of compound winding components in only one rectifier branch is advantageous. The invention can also be used with success without the presence of separate exciter diodes, or where the regulation takes place by sensing the on-board system voltage at the positive terminal B+. The rotor R is shown schematically as a claw pole rotor.

I claim:

1. An electrical generator system, in particular for use with a slip ringless three-phase a-c generator suitable for motor vehicles and the like having a three-phase armature winding (1);

a rotor (R);

at least one exciter winding (100) providing field excitation power;

a full-wave three-phase bridge rectifier (6, 4, 5);

an exciter rectifier (10) connected to the armature winding and supplying excitation current for the exciter winding (100);

and a compound winding (7a, 7b; 8a, 8b; 9a, 9b) positioned to provide additional excitation field and connected to have load current flowing therethrough, wherein the compound winding is composed of at least two compound winding components (7a, 7b; 8a, 8b; 9a, 9b), which compound winding components are connected between a terminal of one phase winding of the armature winding and respective terminals of one phase of the branches of the rectifier bridge (6) in which said one branch carries less than the entire load current.

2. System according to claim 1, wherein the generator comprises six compound windings, grouped in three pairs (7a, 7b; 8a, 8b; 9a, 9b);

one of the terminals of each pair of the winding components being connected to a terminal of the associated armature phase winding (1a, 1b 1c), the other terminal of the respective compound winding components being connected to respective terminals of rectifier elements (4a, 4b, 4c; 5a, 5b, 5c) of the three-phase bridge rectifier (6).

3. System according to claim 1, wherein the exciter rectifier comprises three exciter diodes (10a, 10b, 10c), one terminal of each being connected to the junction of a rectifier element (4a, 4b, 4c) of the three-phase bridge rectifier and the associated compound winding component (7a, 8a, 9a), the other terminals of said exciter diodes forming a regulator terminal (D+) and furnishing excitation current for the exciter winding.

4. System according to claim 1, further including a protective diode (Dp) connected between one of the output terminals of the three-phase rectifier and a utilization terminal (B+), and poled in conductive direction for power flow from the generator to the utilization network to provide protection against reversal of polarity upon connection of an external power source to the utilization network.

5. System according to claim 1, wherein said compound winding comprises six compound winding components, grouped in three pairs (7a, 7b; 8a, 8b; 9a, 9b), each pair being associated with a phase winding (1a, 1b, 1c) of the three-phase armature winding (1);

the three-phase bridge rectifier comprises six diode elements (4a, 5a; 4b, 5b; 4c, 5c), grouped in pairs, in which one pair, each, is associated with a phase of the three-phase armature winding;

and said compound winding components are connected between terminals of the respective three-phase armature windings and respective terminals of the rectifier elements associated with the respective phase.

6. System according to claim 5, wherein the exciter rectifier (10) comprises three exciter diodes (10a, 10b, 10c) having one terminal, each, connected to the junction of one of the rectifier elements (4a, 4b, 4c) of the three-phase bridge rectifier and the compound winding components (7a, 8a, 9a) associated with the respective phase.

* * * * *